United States Patent
Yamaguchi et al.

(10) Patent No.: US 8,574,774 B2
(45) Date of Patent: Nov. 5, 2013

(54) NEGATIVE ELECTRODE AND ALUMINUM AIR CELL

(75) Inventors: Takitaro Yamaguchi, Ryugasaki (JP); Hitoshi Yasuda, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/580,908

(22) PCT Filed: Feb. 18, 2011

(86) PCT No.: PCT/JP2011/053556
§ 371 (c)(1),
(2), (4) Date: Aug. 23, 2012

(87) PCT Pub. No.: WO2011/105301
PCT Pub. Date: Sep. 1, 2011

(65) Prior Publication Data
US 2012/0328963 A1  Dec. 27, 2012

(30) Foreign Application Priority Data
Feb. 25, 2010  (JP) ................. 2010-040916

(51) Int. Cl.
*H01M 4/36* (2006.01)
*H01M 8/22* (2006.01)
*C22C 21/04* (2006.01)
*C22C 21/06* (2006.01)

(52) U.S. Cl.
USPC ............ 429/405; 429/402; 420/547; 420/546

(58) Field of Classification Search
USPC .......................... 429/405, 532; 420/546–547
See application file for complete search history.

(56) References Cited

U.S. PATENT DOCUMENTS

| | | | |
|---|---|---|---|
| 4,751,086 A * | 6/1988 | Jeffrey et al. | 429/221 |
| 4,942,100 A | 7/1990 | Hunter et al. | |
| 2004/0241537 A1 * | 12/2004 | Okuyama et al. | 429/86 |
| 2007/0059592 A1 * | 3/2007 | Takami et al. | 429/161 |
| 2009/0260531 A1 * | 10/2009 | Kurokawa et al. | 101/459 |

FOREIGN PATENT DOCUMENTS

| | | | |
|---|---|---|---|
| JP | 62-074041 A | 4/1987 | |
| JP | 6-179936 A | 6/1994 | |
| JP | 2004-319464 A | 11/2004 | |
| JP | 2006-147442 | * 6/2006 | ............ H01M 12/06 |
| JP | 2006-147442 A | 6/2006 | |
| JP | 2008-091248 A | 4/2008 | |

OTHER PUBLICATIONS

Translation of International Preliminary Report on Patentability and Written Opinion issued Sep. 27, 2012 in International Application No. PCT/JP2011/053556 to Sumitomo Chemical Co., Ltd.

* cited by examiner

*Primary Examiner* — Patrick Ryan
*Assistant Examiner* — Kiran Quraishi
(74) *Attorney, Agent, or Firm* — Sughrue Mion, PLLC

(57) ABSTRACT

There is provided a negative electrode comprising an aluminum alloy, wherein the alloy has a magnesium content of 0.0001% by weight or higher and 8% by weight or lower, the alloy satisfies at least one condition selected from the group consisting of the following (A) and (B):
(A) an iron content is 0.0001% by weight or higher and 0.03% by weight or lower, and
(B) a silicon content is 0.0001% by weight or higher and 0.02% by weight or lower, and a content of each element other than aluminum, magnesium, silicon and iron in the alloy is 0.005% by weight or lower.

11 Claims, 5 Drawing Sheets

NEGATIVE ELECTRODE AND ALUMINUM AIR CELL

CROSS REFERENCE TO RELATED APPLICATIONS

This application is a National Stage of International Application No. PCT/JP2011/053556 filed Feb. 18, 2011, claiming priority based on Japanese Patent Application No. 2010-040916, filed Feb. 25, 2010, the contents of all of which are incorporated herein by reference in their entirety.

TECHNICAL FIELD

The present invention relates to a negative electrode and an aluminum air cell, and particularly relates to a negative electrode used for an aluminum air cell, and an aluminum air cell.

BACKGROUND ART

Air cells using an atmospheric oxygen as an active material allow high energy densification. Air cells are expected as cells capable of being applied to a variety of usage such as electric cars. The air cells include aluminum air cells. Patent Literature 1 discloses an aluminum air cell having an alloy consisting of aluminum, magnesium and manganese as its negative electrode, and Patent Literature 2 discloses an aluminum air cell having an alloy consisting of aluminum, magnesium, tin and manganese as its negative electrode.

CITATION LIST

Patent Literature

Patent Literature 1: U.S. Pat. No. 4,942,100A
Patent Literature 2: JP6-179936A

SUMMARY OF INVENTION

Technical Problem

Conventional aluminum alloys used for negative electrodes of aluminum air cells have unsuitable corrosion resistance to electrolyte solutions containing an acid, an alkali or the like. Therefore, conventional aluminum air cells have an insufficient average discharge voltage.

Solution to Problem

The present invention provides the following.
<1> A negative electrode comprising an aluminum alloy,
wherein the alloy has a magnesium content of 0.0001% by weight or higher and 8% by weight or lower,
the alloy satisfies at least one condition selected from the group consisting of the following (A) and (B):
(A) an iron content is 0.0001% by weight or higher and 0.03% by weight or lower, and
(B) a silicon content is 0.0001% by weight or higher and 0.02% by weight or lower, and
a content of each element other than aluminum, magnesium, silicon and iron in the alloy is 0.005% by weight or lower.
<2> The negative electrode according to <1>, wherein a total content of elements other than aluminum and magnesium in the alloy is 0.1% by weight or lower.

<3> The negative electrode according to <1> or <2>, wherein the alloy comprises an intermetallic compound particle in a matrix of the alloy, and
in a surface of the alloy, a particle-number density of the intermetallic compound particle having a particle size of 0.1 $\mu m^2$ or larger and smaller than 100 $\mu m^2$ is 1000 particles/mm$^2$ or less, and
a particle-number density of the intermetallic compound particle having a particle size of 100 $\mu m^2$ or larger is 10 particles/mm$^2$ or less, and
an occupying area proportion of the intermetallic compound particle is 0.5% or smaller per unit area of the alloy surface.
<4> The negative electrode according to any one of <1> to <3>, wherein the alloy is a rolled material.
<5> The negative electrode according to any one of <1> to <4>, wherein a lead wire is connected to the alloy.
<6> The negative electrode according to <5>, wherein the lead wire has a more noble potential than the alloy.
<7> The negative electrode according to <5> or <6>, wherein an aluminum content of the lead wire is 99.8% by weight or lower.
<8> An aluminum air cell, comprising a negative electrode according to any one of <1> to <7>.
<9> The aluminum air cell according to <8>, comprising: a laminate in which the negative electrode, a separator, a positive electrode having a catalyst layer and a current collector, and a membrane capable of diffusing oxygen are laminated in this order; and an electrolyte.
<10> The aluminum air cell according to <9>, wherein the catalyst layer of the positive electrode contains manganese dioxide or platinum.
<11> The aluminum air cell according to <9>, wherein the catalyst layer of the positive electrode comprises a mixed oxide having a perovskite structure represented by $ABO_3$, wherein A denotes at least two elements selected from the group consisting of La, Sr and Ca, and B denotes at least one element selected from the group consisting of Mn, Fe, Cr and Co.

Advantageous Effects of Invention

The present invention can provide an aluminum air cell having a high average discharge voltage, and a negative electrode suitable for the air cell. The air cell can suitably be used in applications requiring a high voltage, for example, for driving motors for cars and electric tools. The present invention is remarkably industrially useful.

DESCRIPTION OF EMBODIMENTS

Figure 1:
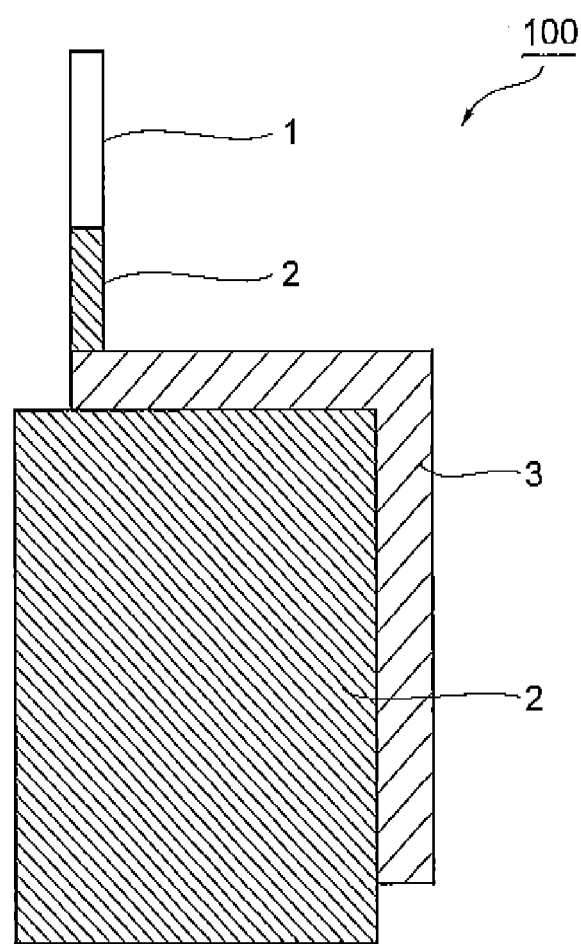
FIG. 1 illustrates a structure of a negative electrode according to one embodiment of an aluminum air cell according to the present invention.

An aluminum alloy (hereinafter, referred to as an aluminum alloy or an alloy in some cases) constituting a negative electrode according to the present invention has a magnesium content of 0.0001 to 8% by weight. If the magnesium content is lower than 0.0001% by weight, the corrosion resistance of the aluminum alloy to an electrolyte solution is not suitable. If the magnesium content exceeds 8% by weight, casting of the aluminum alloy is difficult. From the viewpoint of the easiness of fabrication of a negative electrode, the magnesium content in an alloy is preferably 0.01 to 8% by weight, more preferably 1 to 8% by weight, and still more preferably 2 to 4% by weight.

The alloy satisfies at least one condition selected from the group consisting of the following (A) and (B).

(A) The iron content is 0.0001 to 0.03% by weight (preferably 0.0001 to 0.005% by weight).

(B) The silicon content is 0.0001 to 0.02% by weight (preferably 0.0005 to 0.005% by weight).

If the iron content is lower than 0.0001% by weight and the silicon content is lower than 0.0001% by weight, there arise problems of difficult manufacture and high cost.

If the iron content exceeds 0.03% by weight and the silicon content exceeds 0.02% by weight, when the negative electrode is impregnated with an electrolyte solution of an air cell, the corrosion amount of the aluminum alloy becomes large in some cases.

The content of each element other than Al, Mg, Si and Fe in an alloy is 0.005% by weight or lower, and preferably 0.002% by weight or lower. Examples of the other elements are copper (Cu), titanium (Ti), manganese (Mn), gallium (Ga), nickel (Ni), vanadium (V) and zinc (Zn). If the content of each of the other elements exceeds 0.005% by weight, the corrosion resistance of an aluminum alloy decreases.

Among the other elements, since copper has an outstanding effect on the corrosion resistance of an aluminum alloy, the copper content is preferably 0.002% by weight or lower. If the copper content is high, when the negative electrode is impregnated with an electrolyte solution of an air cell, the corrosion amount of the aluminum alloy becomes especially large.

The total content of the elements other than aluminum and magnesium in an alloy is preferably 0.1% by weight or lower, and more preferably 0.02% by weight. If the total content of the elements other than aluminum and magnesium is 0.1% by weight or lower, the corrosion resistance to an electrolyte solution improves more.

The alloy can contain an intermetallic compound particle (hereinafter, referred to as a particle in some cases) in a matrix of the alloy. The intermetallic compound includes $Al_3Mg$, $Mg_2Si$ and Al—Fe system.

In the case where an alloy contains an intermetallic compound particle in the alloy matrix, the particle-number density of the intermetallic compound particle having a particle size of 0.1 $\mu m^2$ or larger and smaller than 100 $\mu m^2$ is preferably 1000 particles/mm$^2$ or less, and more preferably 500 particles/mm$^2$ or less, in a surface of the alloy. Further similarly, the particle-number density of the intermetallic compound particle having a particle size of 100 $\mu m^2$ or larger is preferably 10 particles/mm$^2$ or less.

The particle size and the particle-number density of a particle can be determined based on an optical microscopic photograph obtained by photographing the surface of the aluminum alloy specularly polished and thereafter etched with an etchant. The etchant includes a 1-wt % sodium hydroxide aqueous solution.

The particle size refers to an area taken by each intermetallic compound particle observed in the optical microscopic photograph.

In the present invention, the range in an aluminum alloy from the surface thereof to a depth of 10 $\mu m$ in the depth direction is regarded to be the alloy surface.

In the alloy surface, if the particle-number density of an intermetallic compound particle having a particle size of 0.1 $\mu m^2$ or larger and smaller than 100 $\mu m^2$ is 1000 particles/mm$^2$ or less, the corrosion resistance of the alloy improves more. If the particle-number density of the intermetallic compound particle having a particle size of larger than 100 $\mu m^2$ is 10 particles/mm$^2$ or less, the corrosion resistance of the alloy improves still more.

In the alloy surface, the occupying area proportion of an intermetallic compound particle is preferably 0.5% or smaller, more preferably 0.2% or smaller, and still more preferably 0.1% or smaller, per unit area of the alloy surface.

The occupying area proportion refers to a proportion of a total value of particle sizes of individual particles observed by the optical microscopic photograph, that is, a total value of areas taken by the individual particles, to the area of the aluminum alloy.

(Method of Manufacturing an Alloy)

An alloy in the present invention can be manufactured, for example, by a method comprising steps of melting a high-purity aluminum (purity: 99.999% or higher) at about 680 to 800° C., inserting a prescribed amount of magnesium (purity: 99.99% or higher) into the melted aluminum to obtain a molten alloy, and then removing hydrogen gas and non-metallic inclusions from the molten alloy. An example of the removal step includes a vacuum treatment of the molten alloy. The vacuum treatment is usually carried out at about 700° C. to about 800° C. for about 1 hour to about 10 hours under a condition of a vacuum degree of 0.1 to 100 Pa. The removal step may utilize a treatment of blowing a flux, an inert gas or a chlorine gas into the molten alloy. The molten alloy cleaned in the removal step is usually cast in a mold to obtain an ingot. The ingot is obtained by a method of casting the molten alloy of 680 to 800° C. in an iron-made or graphite-made mold heated at 50 to 200° C.

Then, the ingot is subjected to a solution heat treatment. The solution heat treatment includes a method in which the ingot is heated from room temperature to about 430° C. at a temperature-rise rate of about 50° C./hr and held at about 430° C. for about 10 hours, successively heated to about 500° C. at a temperature-rise rate of about 50° C./hr and held at about 500° C. for about 10 hours, and thereafter cooled from about 500° C. to about 200° C. at a temperature-fall rate of about 300° C./hr.

The ingot having been subjected to the solution heat treatment is cut to be able to be utilized as a negative electrode. A material obtained by rolling, extruding or forging the ingot has a higher 0.2% yield strength, and is suitably utilized as a negative electrode.

An example of a rolling method of an ingot includes a method of hot rolling and cold rolling the ingot to work the ingot into a plate material. The hot rolling is repeatedly carried out to obtain a target thickness of a plate material, for example, by rolling an ingot at a temperature of 350 to 450° C. and under the condition of a one-pass reduction rate of 2 to 20%.

After the hot rolling, an annealing treatment is usually carried out before cold rolling. In the annealing treatment, for example, a hot rolled plate material is heated at 350 to 450° C., and may be allowed to cool right after the temperature rise, or may be allowed to cool after being held at the temperature for about 1 to 5 hours. This treatment makes the material soft and can provide a preferable state for the cold rolling.

The cold rolling is repeatedly carried out to obtain a target thickness of the plate material, for example, by rolling the plate material at a temperature of lower than a recrystallization temperature of an aluminum alloy, usually at room temperature to 80° C. or lower, under the condition of a one-pass reduction rate of 1 to 10%. The cold rolling can provide an aluminum alloy as a thin plate material having a 0.2% yield strength of 150 N/mm$^2$ or higher.

In a negative electrode according to the present invention, a lead wire is preferably connected to the aluminum alloy. Connection of a lead wire to the alloy allows efficient extraction of a discharge current from the negative electrode in an aluminum air cell.

A material of the lead wire connected to the aluminum alloy suffices if being a conductive material. Examples of the material include one or more metals selected from the group consisting of aluminum, nickel, chromium, iron and titanium, and alloys containing the metal(s). The lead wire preferably has a more noble potential than the aluminum alloy. If the lead wire is more noble than the aluminum alloy, the lead wire exists until the completion of discharge of an aluminum air cell, and the discharge current can efficiently be extracted from the negative electrode.

In the case where the lead wire is aluminum, the aluminum content is preferably 99.8% by weight or lower. If the aluminum content is 99.8% by weight or lower, even in the case where the lead wire is in contact with an electrolyte solution of an air cell during power generation, the corrosion due to a potential difference caused at a connection portion of the aluminum alloy and the lead wire can be suppressed. Consequently, in the aluminum air cell, the discharge current can efficiently be extracted from the negative electrode.

(Aluminum Air Cell)

An aluminum air cell according to the present invention comprises a negative electrode according to the present invention. The aluminum air cell according to the present invention preferably comprises: a laminate in which the negative electrode, a separator, a positive electrode having a catalyst layer and a current collector, and a membrane capable of diffusing oxygen (hereinafter, also referred to as an oxygen diffusion membrane) are laminated in this order; and an electrolyte.

Hereinafter, as one embodiment of an aluminum air cell according to the present invention, an aluminum air cell further comprising a container, and comprising the laminate and the electrolyte in the container will be described.

(Negative Electrode)

As a negative electrode, the negative electrode according to the present invention described above is used.

FIG. 1 illustrates a structure of a negative electrode according to one embodiment of an aluminum air cell according to the present invention. A negative electrode 100 illustrated in FIG. 1 has an aluminum alloy 3, and an external connection terminal (lead wire) 1 is connected to an end of the aluminum alloy 3. One surface of the aluminum alloy 3 not being in contact with an electrolyte solution, and a part of the lead wire 1 are covered with an imide tape 2.

For the lead wire (negative electrode lead wire) 1, the above-mentioned lead wire material can be used. The shape of the negative electrode includes platy, mesh, porous plate and sponge ones.

Although, in FIG. 1, one surface of the aluminum alloy 3 not being in contact with an electrolyte solution, and a part of the lead wire 1 are covered with the imide tape 2, the imide tape 2 may be used or not. However, it is preferable from the viewpoint of suppressing generation of local cells that one surface of an aluminum alloy not being in contact with an electrolyte solution, and a part of a lead wire be covered with a material, such as an imide tape, through which ions participating in the cell reaction cannot permeate, as illustrated in FIG. 1.

(Separator)

A separator is not especially limited as long as being an insulating material in which an electrolyte can move, and examples thereof include nonwoven fabrics or porous membranes comprising a resin such as a polyolefin or a fluororesin. The resin specifically includes polyethylene, polypropylene, polytetrafluoroethylene and polyvinylidene fluoride. In the case where the electrolyte is an aqueous solution, the separator may be hydrophilicized. The resin in this case includes hydrophilicized polyethylene, polypropylene, polytetrafluoroethylene and polyvinylidene fluoride.

(Positive Electrode)

Figure 2:
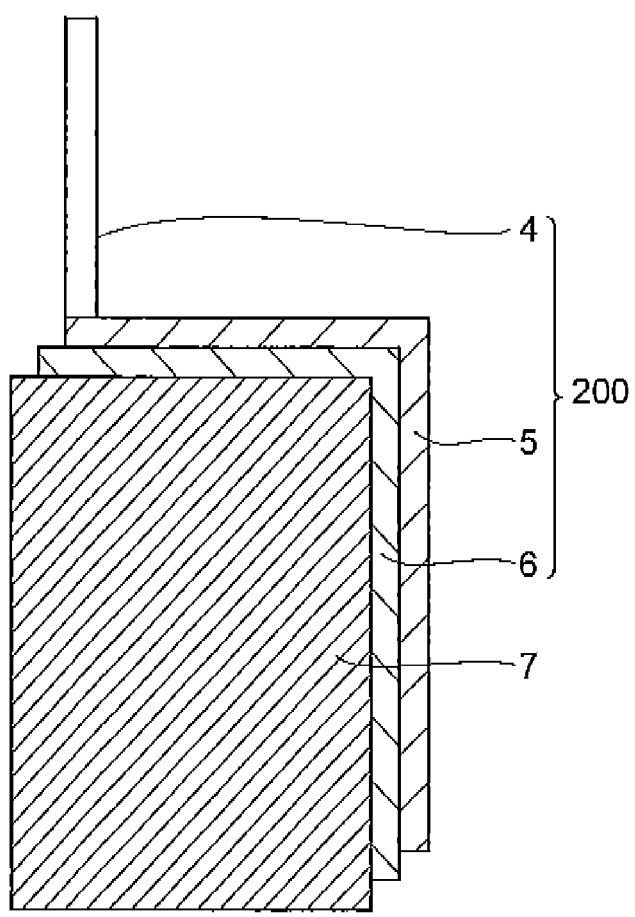
FIG. 2 illustrates a structure of a positive electrode and an oxygen diffusion membrane according to one embodiment of an aluminum air cell according to the present invention.

FIG. 2 illustrates a structure of a positive electrode and an oxygen diffusion membrane according to one embodiment of an aluminum air cell according to the present invention. A positive electrode 200 illustrated in FIG. 2 has a current collector 5, and a catalyst layer (positive electrode catalyst layer) 6 formed on the current collector 5, and an external connection terminal (lead wire) 4 is connected to an end of the current collector 5. An oxygen diffusion membrane 7 described later is laminated on the positive electrode 200.

The current collector 5 suffices if being a conductive material, and examples thereof include a metal consisting of nickel, chromium, iron or titanium, and alloys containing the metal(s); and preferably nickel or stainless steel (iron-nickel-chromium alloy). The shape thereof includes mesh and porous plate ones.

The lead wire (positive electrode lead wire) 4 suffices if being a conductive material, and examples thereof include one or more metals selected from the group consisting of nickel, chromium, iron and titanium, and alloys containing the metal(s), and preferably include nickel and stainless steel.

The catalyst layer 6 in the positive electrode 200 has a catalyst. The catalyst layer 6 preferably contains, in addition to the catalyst, a conductive agent and a binder adhering these on the current collector 5.

The catalyst in the positive electrode 200 suffices if being a material capable of reducing oxygen, and examples thereof include non-oxide materials, such as, platinum, iridium, and carbonaceous materials such as active carbon; oxide materials, such as manganese oxides such as manganese dioxide, iridium oxides, iridium oxides containing one or more metals selected from the group consisting of titanium, tantalum, niobium, tungsten and zirconium, and mixed oxides having a perovskite structure represented by $ABO_3$.

One preferred embodiment of the catalyst layer 6 includes a catalyst layer containing manganese dioxide or platinum.

One preferred embodiment of the catalyst layer 6 includes a catalyst layer containing a mixed oxide having a perovskite structure represented by $ABO_3$ wherein A denotes at least two elements selected from the group consisting of La, Sr and Ca, and B denotes at least one element selected from the group consisting of Mn, Fe, Cr and Co.

Platinum is more preferable because of having a high catalytic activity to the reduction of oxygen. The above-mentioned mixed oxide having a perovskite structure is preferable because of being capable of absorbing and releasing oxygen. Thereby, an aluminum air cell can be used also as a secondary cell.

The conductive agent in the positive electrode 200 suffices if being a material capable of improving the conductivity of the catalyst layer (positive electrode catalyst layer) 6, and specifically includes carbonaceous materials such as acetylene black and Ketjen Black.

The binder in the positive electrode suffices if being one hardly dissolving in an electrolyte solution to be used, and is preferably fluororesins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, polyvinylidene fluoride, polychlorotrifluoroethylene and chlorotrifluoroethylene-ethylene copolymers.

(Oxygen Diffusion Membrane 7)

The oxygen diffusion membrane 7 suffices if being a membrane through which an atmospheric oxygen permeates suitably, and includes nonwoven fabrics or porous membranes comprising a resin such as a polyolefin or a fluororesin. Specific examples of the resin include polyethylene, polypropylene, polytetrafluoroethylene and polyvinylidene fluoride. The oxygen diffusion membrane 7 is laminated on the positive electrode 200 as illustrated in FIG. 2, and an atmospheric oxygen is supplied to the positive electrode 200 through the oxygen diffusion membrane 7.

(Laminate)

Figure 3:
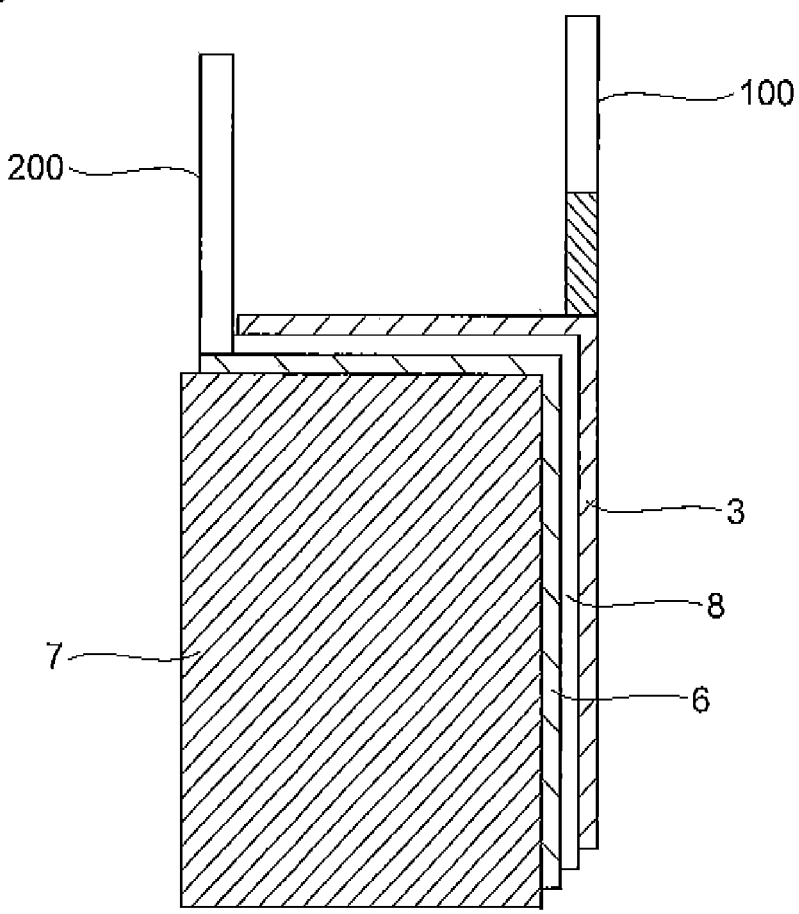
FIG. 3 illustrates a structure of a laminate according to one embodiment of an aluminum air cell according to the present invention.

FIG. 3 illustrates a structure of a laminate according to one embodiment of an aluminum air cell according to the present invention. A laminate 300 illustrated in FIG. 3 is a laminate where the negative electrode 100, a separator 8, the positive electrode 200 and the oxygen diffusion membrane 7 are laminated in this order. The laminate 300 is obtained by laminating the negative electrode 100, the separator 8, the positive electrode 200 and the oxygen diffusion membrane 7 in this order.

(Electrolyte)

An electrolyte is used usually as an electrolyte solution in which the electrolyte is dissolved in an aqueous solvent or a nonaqueous solvent, and is in contact with the negative electrode 100, the separator 8 and the positive electrode 200.

In the case of using an aqueous solvent, the electrolyte solution is preferably an aqueous solution in which NaOH, KOH or NH$_4$Cl as an electrolyte is dissolved. The concentration of NaOH, KOH or NH$_4$Cl in the aqueous solution is preferably 1 to 99% by weight, more preferably 5 to 60% by weight, and still more preferably 5 to 40% by weight.

(Container)

A container accommodates a laminate in which a negative electrode, a separator, a positive electrode and an oxygen diffusion membrane are laminated, and an electrolyte (electrolyte solution). Examples of a material of a container include resins such as polystyrene, polyethylene, polypropylene, polyvinyl chloride and ABS resins; and metals hardly reactive with the negative electrode, the positive electrode and the electrolyte.

Figure 4:
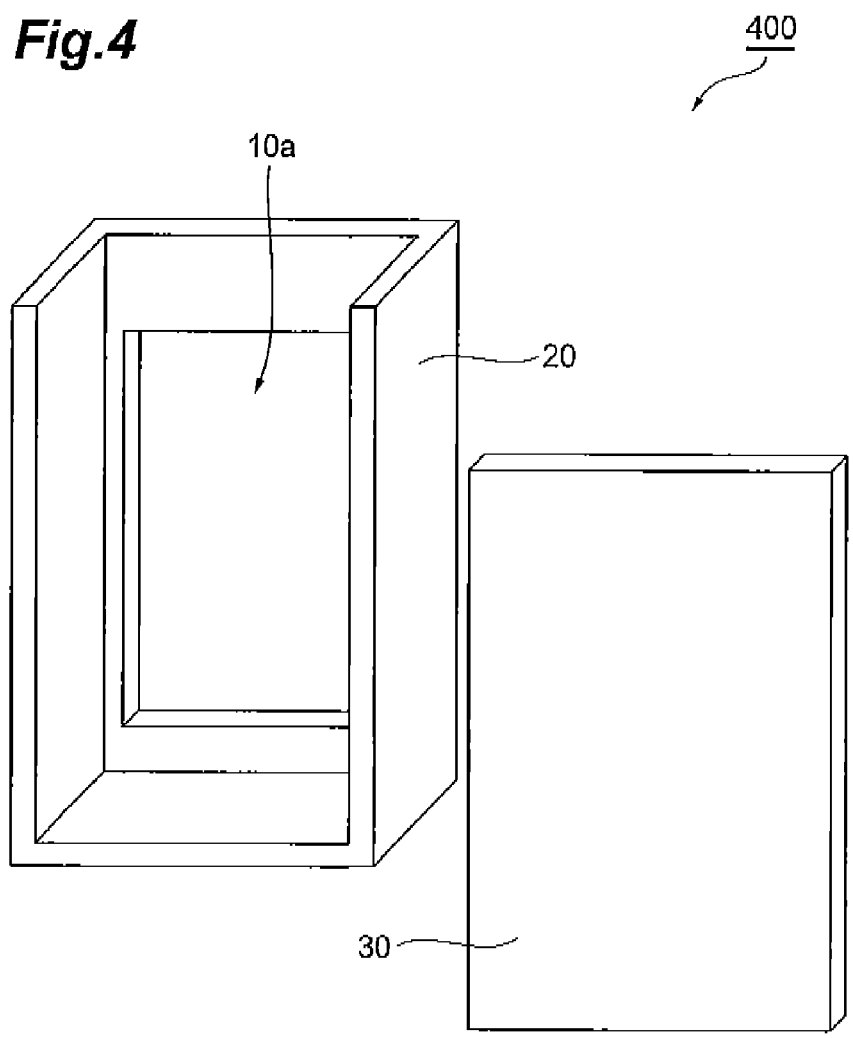
FIG. 4 illustrates a structure of a container according to one embodiment of an aluminum air cell according to the present invention.

FIG. 4 illustrates a structure of a container according to one embodiment of an aluminum air cell according to the present invention. A container 400 illustrated in FIG. 4 is constituted of a container body 20 having an opening 10a formed thereon, and a lid member 30.

Figure 5:
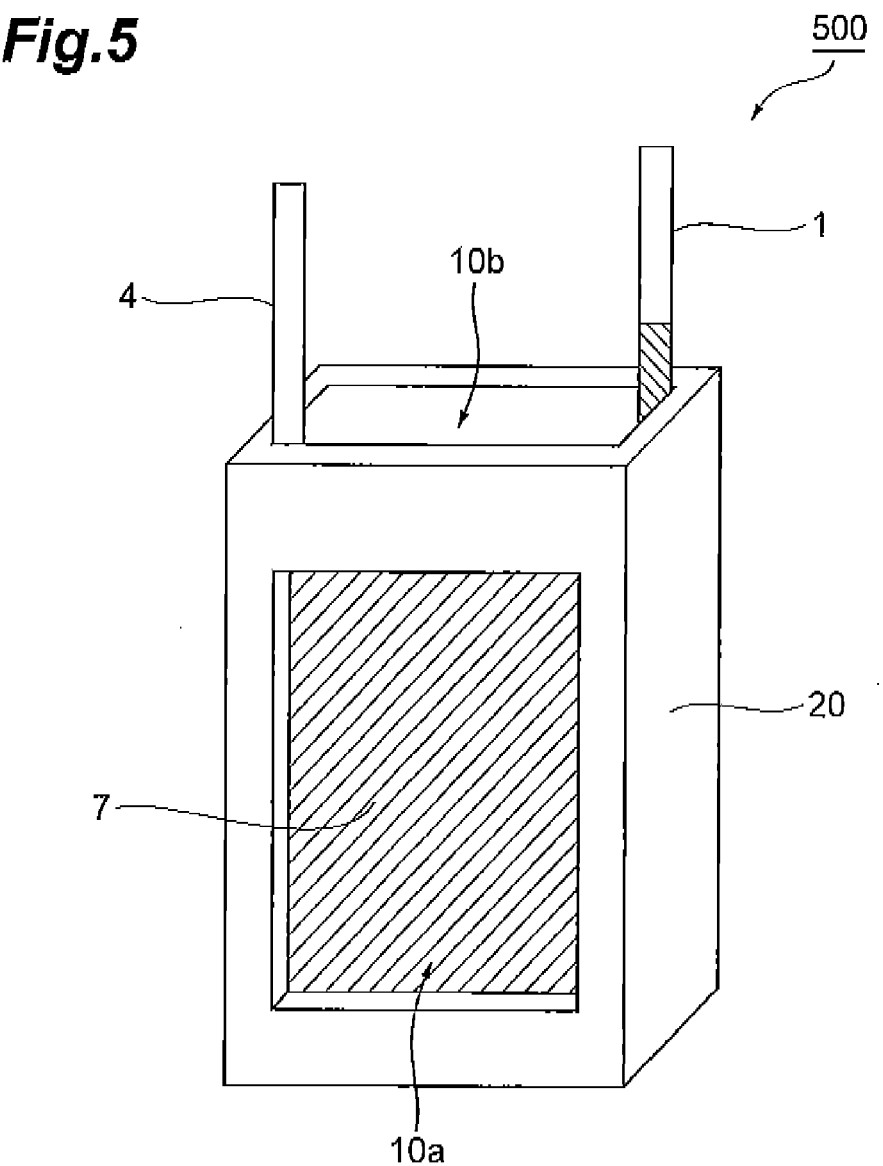
FIG. 5 is an appearance diagram illustrating one embodiment of an aluminum air cell according to the present invention.

FIG. 5 is an appearance diagram illustrating one embodiment of an aluminum air cell according to the present invention. An aluminum air cell 500 illustrated in FIG. 5 has a structure where the laminate 300 is arranged in the container body 20 so that the oxygen diffusion membrane (hereinafter, referred to as "oxygen permeation membrane" according to cases) 7 is brought into close contact with the opening 10a, and where the lid member 30 is adhered to the container body 20. The aluminum air cell 500 has an electrolyte inside the container formed of the container body 20 and the lid member 30. The aluminum air cell 500 can be manufactured, for example, by arranging the laminate 300 in the container body 20 so that the oxygen permeation membrane 7 is brought into close contact with the opening 10a, thereafter adhering the lid member 30 to the container body 20 with an adhesive or the like, and injecting an electrolyte (electrolyte solution) from an opening 10b. In order to prevent leakage of the electrolyte solution, a portion around the edge of the opening 10a and the oxygen permeation membrane are preferably sealed with an epoxy resin-based adhesive or the like.

In the aluminum air cell according to the present embodiment having the above-mentioned constitution, oxygen can be supplied from the opening 10a formed on the container to the positive electrode through the oxygen permeation membrane 7.

EXAMPLES

Hereinafter, the present invention will be described in detail by way of Examples, but the present invention is not limited to the following Examples.

Measurements of characteristics were carried out as follows.

(Analysis of Components of an Aluminum Alloy)

Mg, Si, Fe, Cu, Ti, Mn, Ga, Ni, V and Zn in an aluminum alloy were quantitatively determined using an emission spectrophotometer (model: ARL-4460, made by Thermo Fisher Scientific K.K.). These elements can be quantitatively determined more precisely by a glow discharge mass spectrometer.

(Rolling Reduction Rate)

The rolling reduction rate was calculated by the following expression from a cross-sectional area ($S_0$) of an aluminum alloy before work and a cross-sectional area (S) of the aluminum alloy after work.

$$\text{Reduction rate (\%)} = (S_0 - S)/S_0 \times 100$$

(Particle Size, Particle-Number Density and Occupying Area Proportion of an Intermetallic Compound on an Aluminum Alloy Surface)

The surface of an aluminum alloy was specularly polished; and the surface after the polishing was immersed in a 1-wt % sodium hydroxide aqueous solution at 20° C. for 60 sec to be etched, and washed with water. Then, the surface was photographed using an optical microscope. The particle size, the particle-number density (the number of particles per unit area) and the occupying area proportion of an intermetallic compound particle were determined by an optical microscopic photograph of a photographing magnification of 200×. Particles having a size of smaller than 0.1 μm$^2$, which were difficult to distinguish by an optical microscopic photograph, were not counted.

(Strength (0.2% Yield Strength) of an Aluminum Alloy)

The strength of an aluminum alloy was determined for a JIS No. 5 test piece by a 0.2% off-set method at a test speed of 20 mm/min using INSTRON 8802.

(Corrosion Resistance of an Aluminum Alloy)

A test piece (40 mm long, 40 mm wide and 0.5 mm thick) was immersed in sulfuric acid (concentration: 1 mol/L, temperature: 80° C.). At 2 hours, 8 hours and 24 hours after the immersion, Al and Mg having eluted were measured. The Al and Mg having eluted were quantitatively determined by an inductively coupled plasma emission spectrometry (ICP-AES).

Manufacture Example 1

(Manufacture of Aluminum Sample 1)

A high-purity aluminum (purity: 99.999% or higher) was melted at 750° C. to obtain a molten aluminum. Then, the molten aluminum was subjected to a vacuum treatment by holding the molten aluminum at a temperature of 750° C. for 2 hours under a condition of a vacuum degree of 50 Pa. The molten aluminum after the vacuum treatment was cast in a cast iron mold (22 mm×150 mm×200 mm) at 150° C. to obtain an ingot.

Then, the ingot was subjected to a solution heat treatment under the following condition. The ingot was heated from room temperature (25° C.) to 430° C. at a temperature-rise rate of 50° C./hr and held at 430° C. for 10 hours, successively heated to 500° C. at a temperature-rise rate of 50° C./hr and held at 500° C. for 10 hours, and thereafter cooled from 500° C. to 200° C. at a temperature-fall rate of 300° C./hr.

Both surfaces of the ingot having been subjected to the solution heat treatment were subjected to a 2-mm facing, and thereafter hot rolled to obtain an aluminum plate. The hot rolling was carried out at from 350° C. to 450° C. at a reduction rate of 83% from a thickness of 18 mm to 3 mm. Then, an annealing treatment was carried out by a method in which the hot rolled aluminum plate was heated to 370° C., thereafter held at 370° C. for 1 hour, and allowed to cool. Then, the aluminum plate was cold rolled to obtain a rolled plate. The cold rolling was carried out at 50° C. or lower. The thickness of the rolled plate obtained was 0.1 mm. The rolled plate obtained is referred to as Sample 1. The measurement result of components contained in Sample 1 is shown in Table 1.

Manufacture Example 2

(Manufacture of Aluminum Alloy Sample 2)

A high-purity aluminum (purity: 99.999% or higher) was melted at 750° C., and magnesium (purity: 99.99% or higher) was blended and inserted in the melted aluminum so that the Mg content became 2.5% by weight in the alloy to thereby obtain an Al—Mg molten alloy whose Mg content was 2.5% by weight. Then, the molten alloy was subjected to a vacuum treatment by holding the molten alloy at a temperature of 750° C. for 2 hours under a condition of a vacuum degree of 50 Pa. The molten alloy after the vacuum treatment was cast in a cast iron mold (22 mm×150 mm×200 mm) at 150° C. to obtain an ingot.

Then, the ingot was subjected to a solution heat treatment under the following condition. The ingot was heated from room temperature (25° C.) to 430° C. at a temperature-rise rate of 50° C./hr and held at 430° C. for 10 hours, successively heated to 500° C. at a temperature-rise rate of 50° C./hr and held at 500° C. for 10 hours, and thereafter cooled from 500° C. to 200° C. at a temperature-fall rate of 300° C./hr.

Both surfaces of the ingot having been subjected to the solution heat treatment were subjected to a 2-mm facing, and thereafter hot rolled to obtain an aluminum alloy plate. The hot rolling was carried out at from 350° C. to 450° C. at a reduction rate of 83% from a thickness of 18 mm to 3 mm. Then, an annealing treatment was carried out by a method in which the hot rolled aluminum alloy plate was heated to 370° C., thereafter held at 370° C. for 1 hour, and allowed to cool. Then, the aluminum alloy plate was cold rolled to obtain a rolled plate. The cold rolling was carried out at 50° C. or lower. The thickness of the rolled plate obtained was 0.1 mm. The rolled plate obtained is referred to as Sample 2. The measurement result of components contained in Sample 2 is shown in Table 1.

Manufacture Example 3

(Manufacture of Aluminum Alloy Sample 3)

Sample 3 was manufactured by the same operation as in Manufacture Example 2, except for blending Mg so that the Mg content became 3.8% by weight. The measurement result of components contained in Sample 3 is shown in Table 1.

Manufacture Example 4

(Manufacture of Aluminum Alloy Sample 4)

Sample 4 is manufactured by the same operation as in Manufacture Example 2, except for blending Mg so that the Mg content became 5.0% by weight.

Manufacture Example 5

(Manufacture of Aluminum Alloy Sample 5)

Sample 5 is manufactured by the same operation as in Manufacture Example 2, except for blending Mg so that the Mg content became 7.0% by weight.

Manufacture Example 6

(Manufacture of Aluminum Alloy Sample 6)

Sample 6 is manufactured by the same operation as in Manufacture Example 2, except for blending Mg so that the Mg content became 10.0% by weight.

Manufacture Example 7

(Manufacture of Aluminum Alloy Sample 7)

Sample 7 is manufactured by the same operation as in Manufacture Example 2, except for blending Mg so that the Mg content became 12.0% by weight.

Manufacture Example 8

(Manufacture of Aluminum Sample 8)

Sample 8 was manufactured by the same operation as in Manufacture Example 1, except for using an aluminum (purity: 99.8%) in place of a high-purity aluminum (purity: 99.999%). The measurement result of components contained in Sample 8 is shown in Table 1.

Manufacture Example 9

(Manufacture of Aluminum Alloy Sample 9)

Sample 9 was manufactured by the same operation as in Manufacture Example 2, except for using an aluminum (purity: 99.8%) in place of a high-purity aluminum (purity: 99.999%). The measurement result of components contained in Sample 9 is shown in Table 1.

Manufacture Example 10

(Manufacture of Aluminum Alloy Sample 10)

Sample 10 was manufactured by the same operation as in Manufacture Example 2, except for using an aluminum (purity: 99.8%) in place of a high-purity aluminum (purity: 99.999%), and blending Mg so that the Mg content became 3.7% by weight. The measurement result of components contained in Sample 10 is shown in Table 1.

Manufacture Example 11

(Manufacture of Aluminum Alloy Sample 11)
Sample 11 was manufactured by the same operation as in Manufacture Example 2, except for blending Cu (purity: 99.99%) so that the Cu content became 0.5% by weight, in place of Mg. The measurement result of components contained in Sample 11 is shown in Table 1.

Manufacture Example 12

(Manufacture of Aluminum Alloy Sample 12)
Sample 12 was manufactured by the same operation as in Manufacture Example 2, except for blending Mg so that the Mg content became 1.5% by weight. The measurement result of components contained in Sample 12 is shown in Table 1.

Manufacture Example 13

(Manufacture of Aluminum Alloy Sample 13)
Sample 13 was manufactured by the same operation as in Manufacture Example 2, except for blending Mg so that the Mg content became 1.0% by weight. The measurement result of components contained in Sample 13 is shown in Table 1.

Manufacture Example 14

(Manufacture of Aluminum Alloy Sample 14)
Sample 14 was manufactured by the same operation as in Manufacture Example 2, except for blending Mg so that the Mg content became 0.5% by weight. The measurement result of components contained in Sample 14 is shown in Table 1.

Manufacture Example 15

(Manufacture of Aluminum Alloy Sample 15)
Sample 15 was manufactured by the same operation as in Manufacture Example 2, except for blending Mg so that the Mg content became 0.25% by weight. The measurement result of components contained in Sample 15 is shown in Table 1.

Manufacture Example 16

(Manufacture of Aluminum Alloy Sample 16)
Sample 16 was manufactured by the same operation as in Manufacture Example 2, except for blending Mg so that the Mg content became 0.1% by weight. The measurement result of components contained in Sample 16 is shown in Table 1.

Manufacture Example 17

(Manufacture of Aluminum Alloy Sample 17)
Sample 17 was manufactured by the same operation as in Manufacture Example 2, except for blending Mg so that the Mg content became 0.05% by weight. The measurement result of components contained in Sample 17 is shown in Table 1.

Manufacture Example 18

(Manufacture of Aluminum Alloy Sample 18)
Sample 18 was manufactured by the same operation as in Manufacture Example 2, except for blending Mg so that the Mg content became 0.01% by weight. The measurement result of components contained in Sample 18 is shown in Table 1.

TABLE 1

| | Raw Material Aluminum | Chemical Components (wt %) | | | | | | | | | | Total (wt %) Excluding Al + Mg |
|---|---|---|---|---|---|---|---|---|---|---|---|---|
| | | Mg | Si | Fe | Cu | Ti | Mn | Ga | Ni | V | Zn | |
| Sample 1 | high purity | 0.00004 | 0.0002 | 0.00008 | 0.00018 | ≤0.00002 | ≤0.00001 | ≤0.00005 | ≤0.00003 | ≤0.00002 | ≤0.0001 | ≤0.00071 |
| Sample 2 | high purity | 2.5 | 0.009 | 0.0002 | ≤0.001 | ≤0.001 | ≤0.001 | ≤0.001 | ≤0.001 | ≤0.001 | ≤0.001 | ≤0.011 |
| Sample 3 | high purity | 3.8 | 0.005 | 0.0003 | ≤0.001 | ≤0.001 | ≤0.001 | ≤0.001 | ≤0.001 | ≤0.001 | ≤0.001 | ≤0.013 |
| Sample 8 | low purity | ≤0.001 | 0.043 | 0.075 | ≤0.001 | 0.005 | ≤0.001 | 0.012 | 0.005 | 0.007 | 0.002 | ≥0.148 |
| Sample 9 | low purity | 2.5 | 0.044 | 0.075 | ≤0.001 | 0.005 | ≤0.001 | 0.011 | 0.005 | 0.007 | 0.002 | ≥0.149 |
| Sample 10 | low purity | 3.7 | 0.044 | 0.072 | ≤0.001 | 0.006 | ≤0.001 | 0.011 | 0.005 | 0.008 | 0.002 | ≥0.148 |
| Sample 11 | high purity | ≤0.0001 | 0.0002 | 0.00012 | 0.51 | ≤0.0001 | 0.00003 | ≤0.0001 | ≤0.0001 | ≤0.0001 | ≤0.0001 | ≥0.511 |
| Sample 12 | high purity | 1.5 | ≤0.001 | ≤0.001 | ≤0.001 | ≤0.001 | ≤0.001 | ≤0.001 | ≤0.001 | ≤0.001 | ≤0.001 | ≤0.01 |
| Sample 13 | high purity | 1.0 | ≤0.001 | ≤0.001 | ≤0.001 | ≤0.001 | ≤0.001 | ≤0.001 | ≤0.001 | ≤0.001 | ≤0.001 | ≤0.01 |
| Sample 14 | high purity | 0.52 | ≤0.001 | ≤0.001 | ≤0.001 | ≤0.001 | ≤0.001 | ≤0.001 | ≤0.001 | ≤0.001 | ≤0.001 | ≤0.01 |
| Sample 15 | high purity | 0.26 | ≤0.001 | ≤0.001 | ≤0.001 | ≤0.001 | ≤0.001 | ≤0.001 | ≤0.001 | ≤0.001 | ≤0.001 | ≤0.01 |
| Sample 16 | high purity | 0.10 | ≤0.001 | ≤0.001 | ≤0.001 | ≤0.001 | ≤0.001 | ≤0.001 | ≤0.001 | ≤0.001 | ≤0.001 | ≤0.01 |
| Sample 17 | high purity | 0.053 | ≤0.001 | ≤0.001 | ≤0.001 | ≤0.001 | ≤0.001 | ≤0.001 | ≤0.001 | ≤0.001 | ≤0.001 | ≤0.01 |
| Sample 18 | high purity | 0.011 | ≤0.001 | ≤0.001 | ≤0.001 | ≤0.001 | ≤0.001 | ≤0.001 | ≤0.001 | ≤0.001 | ≤0.001 | ≤0.01 |

(Manufacture of Electrolyte Solution 1)

A 1-mol/L KOH aqueous solution was manufactured by mixing potassium hydroxide and pure water, and was made to be Electrolyte Solution 1.

(Manufacture of Electrolyte Solution 2)

A 1-mol/L NaOH aqueous solution was manufactured by mixing sodium hydroxide and pure water, and was made to be Electrolyte Solution 2.

Measurement Example 1

(Measurement of the Self-Corrosion Amount)

The 0.1-mm plate materials of Samples 1 to 3 and 8 to 18 were each cut into a disc having a diameter of 13 mm. The each disc was impregnated with the 1.0-mol/L KOH aqueous solution being Electrolyte Solution 1, at 23° C. for 20 min; and the dry weight of the aluminum alloy after the impregnation and the dry weight thereof before the impregnation were measured to measure a self-corrosion amount. The results are shown in Table 2.

From Table 2, it is found that the corrosion amounts of Samples 2 and 3 each, in which Mg was added to a high-purity aluminum, were suppressed to about 50 to 70% as compared to Sample 1, in which the high-purity aluminum was used.

TABLE 2

| | Dissolved Amount (mg/cm² · 20-min) |
|---|---|
| Sample 1 | 0.72 |
| Sample 2 | 0.38 |
| Sample 3 | 0.42 |
| Sample 8 | 1.85 |
| Sample 9 | 2.36 |
| Sample 10 | 2.40 |
| Sample 11 | 1.26 |
| Sample 12 | 0.38 |
| Sample 13 | 0.41 |
| Sample 14 | 0.35 |
| Sample 15 | 0.28 |
| Sample 16 | 0.28 |
| Sample 17 | 0.33 |
| Sample 18 | 0.41 |

Measurement Example 2

(Measurement of an Electrode Potential)

The 0.1-mm plate materials of Samples 1 to 3 and 8 to 18 were each cut into a rectangular plate of 5×15 mm. The each plate was impregnated with Electrolyte Solution 1 at 23° C., and was measured for an electrode potential with reference to a saturated calomel electrode. The results are shown in Table 3.

From Table 3, it is found that whereas the electrode potential of Sample 1, in which a high-purity aluminum was used, was −1.66 V, the electrode potentials of Samples 2 and 3 each, in which Mg was added to the high-purity aluminum, were −1.9 to −2.0 V.

TABLE 3

| | Electrode Potential (V) |
|---|---|
| Sample 1 | −1.66 |
| Sample 2 | −1.92 |
| Sample 3 | −1.95 |
| Sample 8 | −1.45 |
| Sample 9 | −1.49 |
| Sample 10 | −1.49 |
| Sample 11 | −1.53 |

TABLE 3-continued

| | Electrode Potential (V) |
|---|---|
| Sample 12 | −1.90 |
| Sample 13 | −1.94 |
| Sample 14 | −1.92 |
| Sample 15 | −1.79 |
| Sample 16 | −1.79 |
| Sample 17 | −1.77 |
| Sample 18 | −1.75 |

Measurement Example 3

(Measurement of the Strength (0.2% Yield Strength) of a Rolled Plate)

The strengths of Samples 2, 3 and 8 to 10 were measured. The results are shown in Table 4.

TABLE 4

| | 0.2% Yield Strength N/mm² |
|---|---|
| Sample 2 | 265 |
| Sample 3 | 330 |
| Sample 8 | 158 |
| Sample 9 | 273 |
| Sample 10 | 343 |

Measurement Example 4

(Measurements of the Particle Size, the Particle-Number Density and the Occupying Area Proportion of a Compound in an Aluminum Alloy)

The particle sizes, the particle-number densities (particle density) and the occupying area proportions of the compounds in Samples 2, 3 and 8 to 10 were measured. The results are shown in Table 5 and Table 6.

TABLE 5

| | Particle Density (particles/mm²) | | | |
|---|---|---|---|---|
| | Particle Size: ≥0.1 μm² and <1 μm² | Particle Size: ≥1 μm² and <100 μm² | Particle Size: ≥100 μm² and <1000 μm² | Total |
| Sample 2 | 333 | 124 | 0 | 457 |
| Sample 3 | 186 | 124 | 0 | 310 |
| Sample 8 | 70 | 310 | 15 | 395 |
| Sample 9 | 891 | 1604 | 15 | 2510 |
| Sample 10 | 2409 | 2286 | 0 | 4695 |

TABLE 6

| | Occupying Area Proportion (%) | | | |
|---|---|---|---|---|
| | Particle Size: ≥0.1 μm² and <1 μm² | Particle Size: ≥1 μm² and <100 μm² | Particle Size: ≥100 μm² and <1000 μm² | Total |
| Sample 2 | 0.012 | 0.044 | 0 | 0.056 |
| Sample 3 | 0.008 | 0.033 | 0 | 0.041 |
| Sample 8 | 0.002 | 0.62 | 0.17 | 0.79 |
| Sample 9 | 0.036 | 2.3 | 0.21 | 2.6 |
| Sample 10 | 0.09 | 1.2 | 0 | 1.3 |

Measurement Example 5

(Measurement of the Corrosion Resistance of an Aluminum Alloy)

The corrosion resistances of Samples 2, 3 and 8 to 10 were measured. The results are shown in Table 7.

TABLE 7

| | Elution Rate (mg/cm$^2$ · hr) | |
| --- | --- | --- |
| | Al | Mg |
| Sample 2 | 0.17 | 0.004 |
| Sample 3 | 0.19 | 0.008 |
| Sample 8 | 0.54 | — |
| Sample 9 | 0.93 | 0.023 |
| Sample 10 | 0.93 | 0.039 |

Measurement Example 6

Aluminum air cells using Samples 1 to 3 and 8 to 11 as their negative electrode were manufactured and evaluated for their performance.

Comparative Example 1

(Manufacture of Aluminum Air Cell 1)
(Fabrication of a Negative Electrode)

Sample 1 was cut into 40 mm long×30 mm wide, and thereafter, an aluminum lead wire (purity: 99.5%, 50 mm long×3 mm wide×0.20 mm thick, electrode potential: −1.45 V) was attached to the cut sample by a resistance welding machine to thereby fabricate a negative electrode. The resistance welded portion, 10 mm of the aluminum lead wire extending form the resistance welded portion, and one surface of the aluminum (40 mm long×30 mm wide) were masked with an imide tape.

(Fabrication of a Separator)

A separator used was a porous membrane (43 mm long×33 mm wide×0.1 mm thick) made of a hydrophilicized polytetrafluoroethylene.

(Fabrication of a Positive Electrode)

A catalyst layer was constituted of an acetylene black as a conductive agent, an electrolytic $MnO_2$ as a catalyst to promote reduction of oxygen, and a PTFE powder as a binder. The weight ratio of the acetylene black:the electrolytic $MnO_2$:the PTFE was 10:10:1, and a catalyst layer 4 of 40 mm long×30 mm wide×0.3 mm thick was formed. A nickel ribbon terminal 5 (50 mm long×3 mm wide×0.20 mm thick) being a lead wire for external connection was connected to an end of a stainless steel mesh-made current collector 3 (40 mm long× 30 mm wide×0.1 mm thick) for discharge. The catalyst layer was brought into contact with the current collector to thereby obtain a positive electrode.

(Attachment of an Oxygen Diffusion Membrane to the Positive Electrode)

A water-repellent PTFE sheet (40 mm long×30 mm wide× 0.1 mm thick) was placed on the positive electrode and press bonded to laminate an oxygen diffusion membrane on the positive electrode.

(Assembly of Cell 1)

The oxygen diffusion membrane and the positive electrode fabricated as described above were placed in a container, and the separator and the negative electrode composed of Sample 1 were laminated thereon in this order; and the container was covered with a lid member. Thereafter, a portion around a container opening 10a/the oxygen diffusion membrane was sealed with an epoxy-based adhesive.

Electrolyte Solution 1 was injected from an opening 10b to thereby fabricate Aluminum Air Cell 1 (see FIG. 5).

<Evaluation of the Performance of an Air Cell>
(Discharge Test)

The aluminum air cell fabricated as described above was connected to a charge/discharge tester (product name: TOSCAT-3000U, made by Toyo System Co., Ltd.); and a constant-current discharge (CC discharge) at 10 mA/cm$^2$ was carried out on the aluminum of the negative electrode, and cut off at an end voltage of 0.5 V. As a result, the discharge capacity of the aluminum of the negative electrode per weight thereof was 1500 mAh/g. The average discharge voltage was 1.25 V.

Example 1

(Manufacture of Aluminum Air Cell 2)

Aluminum Air Cell 2 was fabricated in the same manner as in Comparative Example 1, except for altering the negative electrode of Aluminum Air Cell 1 to a negative electrode 2 composed of Sample 2, and the discharge test was carried out. As a result, the discharge capacity of the aluminum alloy of the negative electrode per weight thereof was 2400 mAh/g. The average discharge voltage was 1.45 V.

Example 2

(Manufacture of Aluminum Air Cell 3)

Aluminum Air Cell 3 was fabricated in the same manner as in Comparative Example 1, except for altering the negative electrode of Aluminum Air Cell 1 to a negative electrode 3 composed of Sample 3, and the discharge test was carried out. As a result, the discharge capacity of the aluminum alloy of the negative electrode per weight thereof was 2500 mAh/g. The average discharge voltage was 1.45 V.

Example 3

(Manufacture of Aluminum Air Cell 12)

Aluminum Air Cell 12 was fabricated in the same manner as in Comparative Example 1, except for altering the negative electrode of Aluminum Air Cell 1 to a negative electrode 12 composed of Sample 12, and the discharge test was carried out. As a result, the discharge capacity of the aluminum alloy of the negative electrode per weight thereof was 2650 mAh/g. The average discharge voltage was 1.45 V.

Example 4

(Manufacture of Aluminum Air Cell 13)

Aluminum Air Cell 13 was fabricated in the same manner as in Comparative Example 1, except for altering the negative electrode of Aluminum Air Cell 1 to a negative electrode 13 composed of Sample 13, and the discharge test was carried out. As a result, the discharge capacity of the aluminum alloy of the negative electrode per weight thereof was 2730 mAh/g. The average discharge voltage was 1.45 V.

Example 5

(Manufacture of Aluminum Air Cell 14)

Aluminum Air Cell 14 was fabricated in the same manner as in Comparative Example 1, except for altering the negative electrode of Aluminum Air Cell 1 to a negative electrode 14 composed of Sample 14, and the discharge test was carried out. As a result, the discharge capacity of the aluminum alloy of the negative electrode per weight thereof was 2680 mAh/g. The average discharge voltage was 1.45 V.

Example 6

(Manufacture of Aluminum Air Cell 15)

Aluminum Air Cell 15 was fabricated in the same manner as in Comparative Example 1, except for altering the negative electrode of Aluminum Air Cell 1 to a negative electrode 15 composed of Sample 15, and the discharge test was carried out. As a result, the discharge capacity of the aluminum alloy of the negative electrode per weight thereof was 2710 mAh/g. The average discharge voltage was 1.43 V.

Example 7

(Manufacture of Aluminum Air Cell 16)

Aluminum Air Cell 16 was fabricated in the same manner as in Comparative Example 1, except for altering the negative electrode of Aluminum Air Cell 1 to a negative electrode 16 composed of Sample 16, and the discharge test was carried out. As a result, the discharge capacity of the aluminum alloy of the negative electrode per weight thereof was 2690 mAh/g. The average discharge voltage was 1.43 V.

Example 8

(Manufacture of Aluminum Air Cell 17)

Aluminum Air Cell 17 was fabricated in the same manner as in Comparative Example 1, except for altering the negative electrode of Aluminum Air Cell 1 to a negative electrode 17 composed of Sample 17, and the discharge test was carried out. As a result, the discharge capacity of the aluminum alloy of the negative electrode per weight thereof was 2800 mAh/g. The average discharge voltage was 1.39 V.

Example 9

(Manufacture of Aluminum Air Cell 18)

Aluminum Air Cell 18 was fabricated in the same manner as in Comparative Example 1, except for altering the negative electrode of Aluminum Air Cell 1 to a negative electrode 18 composed of Sample 18, and the discharge test was carried out. As a result, the discharge capacity of the aluminum alloy of the negative electrode per weight thereof was 2640 mAh/g. The average discharge voltage was 1.38 V.

Example 10

(Manufacture of Aluminum Air Cell 202)

Aluminum Air Cell 202 was fabricated in the same manner as in Comparative Example 1, except for altering the negative electrode of Aluminum Air Cell 1 to the negative electrode 2 composed of Sample 2, and altering Electrolyte Solution 1 to Electrolyte Solution 2, and the discharge test was carried out. As a result, the discharge capacity of the aluminum alloy of the negative electrode per weight thereof was 2480 mAh/g. The average discharge voltage was 1.45 V.

Comparative Example 2

(Manufacture of Aluminum Air Cell 8)

Aluminum Air Cell 8 was fabricated in the same manner as in Comparative Example 1, except for altering the negative electrode of Aluminum Air Cell 1 to a negative electrode 8 composed of Sample 8, and the discharge test was carried out. As a result, the discharge capacity of the aluminum alloy of the negative electrode per weight thereof was 700 mAh/g. The average discharge voltage was 1.20 V.

Comparative Example 3

(Manufacture of Aluminum Air Cell 9)

Aluminum Air Cell 9 was fabricated in the same manner as in Comparative Example 1, except for altering the negative electrode of Aluminum Air Cell 1 to a negative electrode 9 composed of Sample 9, and the discharge test was carried out. As a result, the discharge capacity of the aluminum alloy of the negative electrode per weight thereof was 1000 mAh/g. The average discharge voltage was 1.30 V.

Comparative Example 4

(Aluminum Air Cell 10)

Aluminum Air Cell 10 was fabricated in the same manner as in Comparative Example 1, except for altering the negative electrode of Aluminum Air Cell 1 to a negative electrode 10 composed of Sample 10, and the discharge test was carried out. As a result, the discharge capacity of the aluminum alloy of the negative electrode per weight thereof was 900 mAh/g. The average discharge voltage was 1.30 V.

Comparative Example 5

(Aluminum Air Cell 11)

Aluminum Air Cell 11 was fabricated in the same manner as in Comparative Example 1, except for altering the negative electrode of Aluminum Air Cell 1 to a negative electrode 11 composed of Sample 11, and the discharge test was carried out. As a result, the discharge capacity of the aluminum alloy of the negative electrode per weight thereof was 1250 mAh/g. The average discharge voltage was 1.25 V.

Comparative Example 6

(Manufacture of Aluminum Air Cell 802)

Aluminum Air Cell 802 was fabricated in the same manner as in Comparative Example 1, except for altering the negative electrode of Aluminum Air Cell 1 to the negative electrode 8 composed of Sample 8, and altering Electrolyte Solution 1 to Electrolyte Solution 2, and the discharge test was carried out. As a result, the discharge capacity of the aluminum alloy of the negative electrode per weight thereof was 1050 mAh/g. The average discharge voltage was 1.20 V.

As described above, the use of the negative electrode according to the present invention for an aluminum air cell can provide a high-capacity and high-voltage aluminum air cell.

INDUSTRIAL APPLICABILITY

The present invention can provide an aluminum air cell having a high average discharge voltage. The air cell can suitably be used especially for applications requiring a high voltage, that is, for driving motors of cars and electric tools, and the like. The present invention is thus remarkably industrially useful.

REFERENCE SIGNS LIST 1, 4 . . . EXTERNAL CONNECTION TERMINAL (LEAD WIRE), 2 . . . IMIDE TAPE, 3 . . . ALUMINUM ALLOY, 5 . . . CURRENT COLLECTOR, 6 . . . CATALYST

LAYER (POSITIVE ELECTRODE CATALYST LAYER), 7 . . . OXYGEN DIFFUSION MEMBRANE (OXYGEN PERMEATION MEMBRANE), 8 . . . SEPARATOR, 10a, 10b . . . OPENING, 20 . . . CONTAINER BODY, 30 . . . LID MEMBER, 100 . . . NEGATIVE ELECTRODE, 200 . . . POSITIVE ELECTRODE, 300 . . . LAMINATE, 400 . . . CONTAINER, 500 . . . ALUMINUM AIR CELL

The invention claimed is:

1. A negative electrode comprising an aluminum alloy,
wherein the alloy has a magnesium content of 0.0001% by weight or higher and 8% by weight or lower,
the alloy comprises an intermetallic compound particle in a matrix of the alloy,
in a surface of the alloy, a particle-number density of the intermetallic compound particle having a particle size of 0.1 µm$^2$ or larger and smaller than 100 µm$^2$ is 1000 particles/mm$^2$ or less,
a particle-number density of the intermetallic compound particle having a particle size of 100 µm$^2$ or larger is 10 particles/mm$^2$ or less,
an occupying area proportion of the intermetallic compound particle is 0.5% or smaller per unit area of the alloy surface,
the alloy satisfies at least one condition selected from the group consisting of the following (A) and (B):
(A) an iron content is 0.0001% to 0.005% by weight, and
(B) a silicon content is 0.0001% by weight or higher and 0.02% by weight or lower, and
a content of each element other than aluminum, magnesium, silicon and iron in the alloy is 0.005% by weight or lower.

2. The negative electrode according to claim 1, wherein a total content of elements other than aluminum and magnesium in the alloy is 0.1% by weight or lower.

3. The negative electrode according to claim 1, wherein the alloy is a rolled material.

4. The negative electrode according to claim 1, wherein a lead wire is connected to the alloy.

5. The negative electrode according to claim 4, wherein the lead wire has a more noble potential than the alloy.

6. The negative electrode according to claim 4, wherein an aluminum content of the lead wire is 99.8% by weight or lower.

7. An aluminum air cell, comprising a negative electrode according to claim 1.

8. The aluminum air cell according to claim 7, comprising: a laminate in which the negative electrode, a separator, a positive electrode having a catalyst layer and a current collector, and a membrane capable of diffusing oxygen are laminated in this order; and an electrolyte.

9. The aluminum air cell according to claim 8, wherein the catalyst layer of the positive electrode contains manganese dioxide or platinum.

10. The aluminum air cell according to claim 8, wherein the catalyst layer of the positive electrode comprises a mixed oxide having a perovskite structure represented by ABO$_3$, wherein A denotes at least two elements selected from the group consisting of La, Sr and Ca, and B denotes at least one element selected from the group consisting of Mn, Fe, Cr and Co.

11. The negative electrode according to claim 1, wherein the alloy has a magnesium content of 2 to 4% by weight.

* * * * *